United States Patent
Ansotegui

(10) Patent No.: US 6,575,690 B1
(45) Date of Patent: Jun. 10, 2003

(54) HAY BALE CART

(76) Inventor: Robert Ansotegui, 1205 S. Harmon Rd., Fallon, NV (US) 89406

( * ) Notice: Subject to any disclaimer, the term of this patent is extended or adjusted under 35 U.S.C. 154(b) by 0 days.

(21) Appl. No.: 10/029,505

(22) Filed: Dec. 21, 2001

(51) Int. Cl.[7] .............................. B62B 1/04; B62B 1/06; B62B 1/12; B62B 1/14
(52) U.S. Cl. ....................... 414/444; 414/450; 414/453; 414/455; 414/457; 280/47.18; 280/47.21; 280/47.26
(58) Field of Search ................................. 414/444, 453, 414/450, 455, 457; 80/47.18, 47.21, 47.26

(56) References Cited

U.S. PATENT DOCUMENTS

| | | | |
|---|---|---|---|
| 3,647,238 A | | 3/1972 | Mackey |
| 3,949,706 A | * | 4/1976 | Coon, Jr. ...................... 119/60 |
| 3,985,253 A | * | 10/1976 | Kannady et al. ............. 214/506 |
| 4,614,349 A | * | 9/1986 | Wenzel ....................... 280/43.1 |
| 5,256,025 A | | 10/1993 | Williamson |
| 5,393,081 A | | 2/1995 | Mortenson |
| 5,580,205 A | * | 12/1996 | Frystak ....................... 414/24.5 |
| 6,050,577 A | | 4/2000 | Smith |
| 6,059,515 A | | 5/2000 | Keller et al. |
| 6,109,856 A | | 8/2000 | Mings |
| 6,227,789 B1 | | 5/2001 | Williamson |

* cited by examiner

Primary Examiner—Steven A. Bratlie
(74) Attorney, Agent, or Firm—William Michael Hynes; Townsend and Townsend Crew LLP

(57) ABSTRACT

This invention relates to a two-wheeled cart with an extended handle for the levered lifting and balanced moving of bales, such as bales of hay. More particularly, hay baled in the form of a rectangular solid is received by the cart at a hay-bale-receiving loader frame and lifted from the ground under leverage about the wheels applied from the handle used for pulling the cart. Once the bale is lifted by the handle and centrally balanced on an axle between the wheels of the cart, the hay-bale-receiving loader frame on the cart can be pivoted in a plane parallel to the axle of the cart. This pivot can occur from a lifting disposition where the major axis of a bale receiving frame is parallel to the axle between the wheels, to a transport disposition where the major axis of the hay-bale-receiving loader frame is normal to the axle between the wheels.

8 Claims, 1 Drawing Sheet

HAY BALE CART

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to a two-wheeled cart with an extended handle for the levered lifting and balanced moving of bales, such as bales of hay. More particularly, hay baled in the form of a rectangular solid is received by the cart at a hay bale receiving loader frame and lifted from the ground under leverage about the wheels applied from the handle used for pulling the cart. Once the bale is lifted by the handle and centrally balanced on an axle between the wheels of the cart, the hay bale receiving loader frame on the cart can be pivoted in a plane parallel to the axle of the cart. This pivot can occur from a lifting disposition, where the major axis of a bale receiving frame is parallel to the axle between the wheels, to a transport disposition, where the major axis of the hay-bale-receiving loader frame is normal to the axle between the wheels. The hay bale receiving loader permits severing of bale ties with retention of the bale contents within the bale receiving loader for convenient flake dispensing of the bale contents.

Hay is commonly baled in what may be described as a wire-bound rectangular solid. As distinguished from a cube (having six equal area sides joining one another at right angles), a rectangular solid has a periphery of four elongate sides relative to a major axis. The rectangular solid is closed at either end by minor sides parallel to minor axes taken normal to the major axis of the rectangular solid. When hay is baled in a rectangular solid, hay is crowded to the bale at right angles to the major axis of the bale. Typical dimensions of such a hay bale are 48 inches along the major axis, and 24 inches along each minor axis. Weight of a bale of hay can be in the range of 100 pounds. The hay is maintained in its baled format by binding ties or wires. When the binding ties or wires are released, hay "flakes" from the bale in sections parallel to the minor axes of the bale.

Hay is commonly fed to horses and cattle. Distribution of hay for feeding from the large and heavy wire bound bale can be difficult, especially for smaller women and children. Prior to a feeding, the bale is dragged or trucked to a location near the animal feed site. Thereafter, the binding ties are severed, and portions of the bale flaked normal to the major axis of the bale and distributed (usually by pitchfork) to about five or six animals having a single feeding from a bale.

Two-wheeled lift trucks have been adapted for moving hay bales. See Mings, U.S. Pat. No. 6,109,856 entitled "Hay Bale Carrier," Keller et al., U.S. Pat. No. 6,059,515 entitled "Hand Truck Having Tines and an Arm for Separating Flakes from Bales of Hay and Like Material," and Smith U.S. Pat. No. 6,050,557 entitled "Manual Transport Vehicle." These devices are conventional handled lift trucks adapted to the special problem of moving hay bales. Bales are transported with an end adjacent the hand truck axles and the bales disposed with their major axis angularly extending upward relative to the ground. With the bale disposed in this disposition, the load is difficult to balance and requires strength. Further, these devices make little or no provision for transport of hay after release of the binding ties about the bale; the released hay easily separates from the bale on such a hand truck.

BRIEF SUMMARY OF THE INVENTION

A two-wheeled cart is provided with an extended handle for the levered lifting and balanced moving of bales, such as bales of hay. Hay baled in the form of a rectangular solid is received by the cart at a hay-bale-receiving loader frame having at least two major sides for confronting two corresponding major sides of hay baled in the form of a rectangular solid. The baled hay is met by the hay-bale-receiving loader frame, with the hay bale being rolled 90° onto the loader frame. Once on the loader frame with the major axis of the loader frame disposed parallel to the axle, the hay bale is lifted from and balanced relative to the ground under leverage on the axle applied from the handle used for pulling the cart. The handle is moved from a substantially vertical lifting position to a substantially horizontal pulling position for hay bale transport. Balancing of the bale occurs with two major surfaces of the hay-bale-receiving loader frame disposed at 45° angles relative to the axle. The loader frame pivots 90° in a plane parallel to the axle with the two major sides of the loader frame remaining in a 45° disposition relative to the axle between the wheels. Once the bale is lifted and centrally balanced relative to the cart by the handle, the hay-bale-receiving loader frame on the cart can be pivoted. The pivot can occur from the lifting disposition to a transport disposition where the major axis of the hay-bale-receiving loader frame and hay bale is normal to the axle between the wheels of the two-wheeled cart. The hay-bale-receiving loader permits severing of bale ties with retention of the tie-released bale contents within the bale-receiving loader for convenient dispensing of the bale contents.

DESCRIPTION OF THE PREFERRED EMBODIMENT

Figure 3:
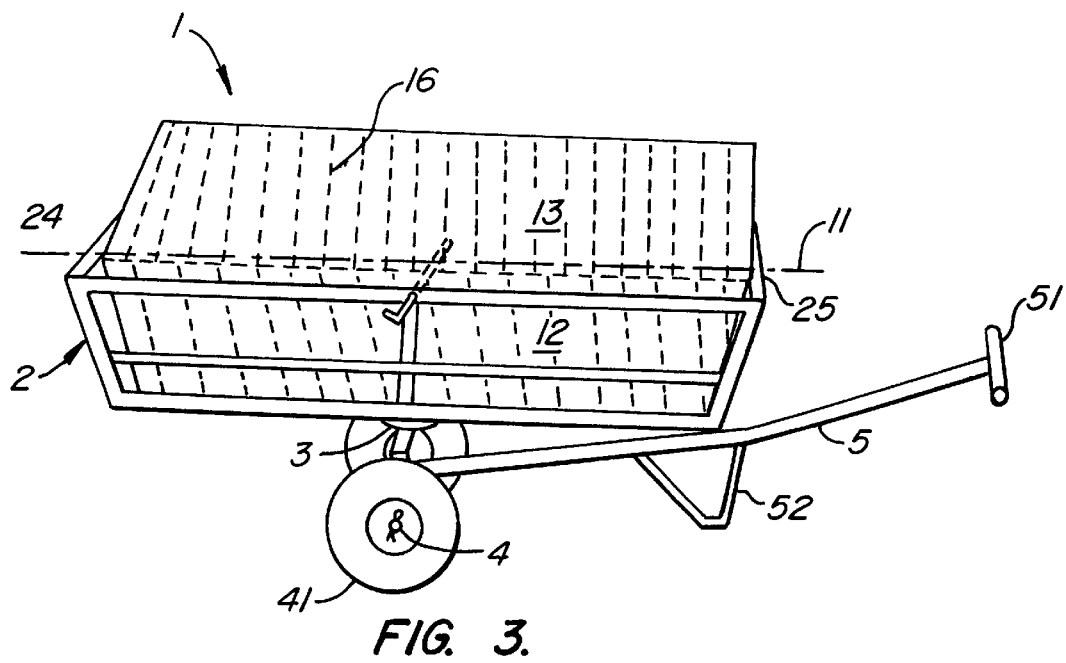

Referring to FIG. 3, the cart of this invention is shown with hay bale 1 disposed within hay-bale-receiving frame 2. Hay-bale-receiving loader frame 2 is mounted on a pivot 3. Pivot 3 is, in turn, centrally mounted overlying axle 4 having wheels 41 mounted on either end of the axle to support the pivot 3. The handle 5 extends from axle 4 to enable cart manipulation.

Figures 1, 2:
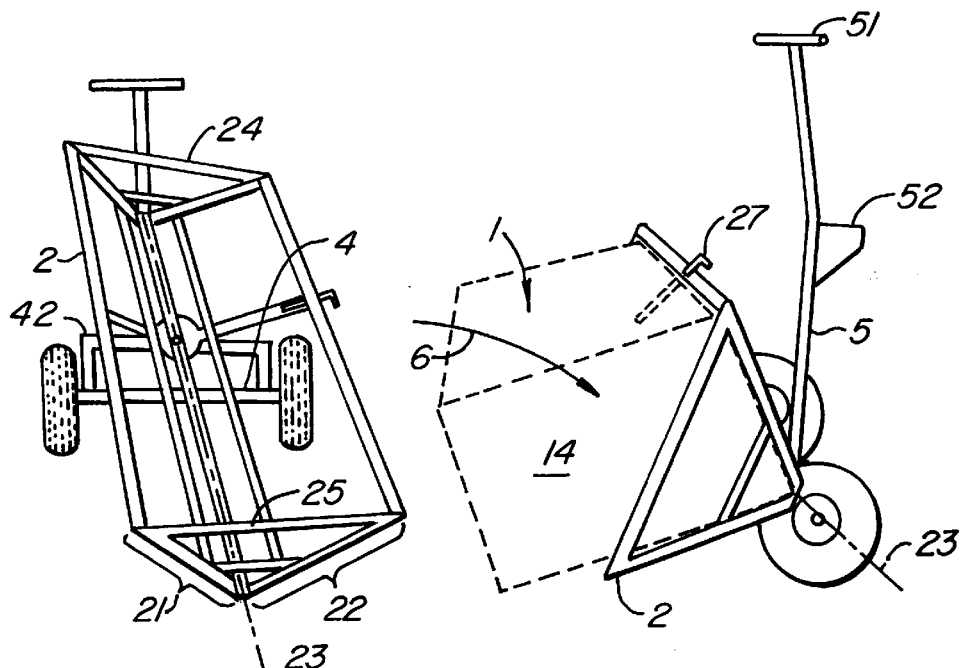
FIG. 1 is a perspective view of the hay cart of this disclosure illustrating the cart overlying the empty bale-receiving loader frame looking down upon the handle, wheels, and axle through the loader frame.
FIG. 2 is a side elevation perspective of the hay cart of this invention illustrating a hay bale rolled onto the loader frame with the handle disposed in a substantially vertical disposition and a bale-engaging tine holding the bale to the hay-bale-receiving loader frame for elevating the bale to a balanced position on the axle between the wheels; and, FIG. 3 is a side perspective view of the hay bale in the loader frame pivoted in a plane parallel to the axle between the wheels to a transport disposition where the major axis of the loader frame is normal to the axle.

It is necessary to describe the geometry of bale 1 in order that the terminology of this disclosure can be fully understood. Bale 1 is elongate about the major axis 11. It has four major sides, with only major sides 12 and 13 being visible in FIG. 3. Referring briefly to FIG. 2, a minor side or end 14 of bale 1 is shown. The bale, of course, has two such minor sides and forms a generally rectangular solid. Typically, hay is crowded to the bale normal to the major axis 11. Once this crowding has occurred, ties 16 are wrapped and tightened about the bale to maintain crowded hay in a unitary mass. As will be understood hereafter, hay-bale-receiving frame 2 is configured to abut two adjacent major sides of bale 1.

Hay-bale-receiving loader frame 2 has a first major side 21 and a second major side 22 with both these major sides being disposed at 90 degrees one to another about a hay-bale-receiving loader frame major axis 23. It is preferred (but not required) that hay-bale-receiving loader frame 2 have respective ends 24, 25. As can be seen with respect FIG. 3, respective ends 24, 25 confine hay bale 1 within a bale-receiving loader frame 2.

Returning to FIG. 2, hay-bale-receiving loader frame 2 is optionally equipped with a bale-engaging tine 27. As will hereinafter be emphasized, this bail-engaging tine 27 can be used to ensure that the cart both grasps and elevates bale I when the bale is disposed within hay-bale-receiving loader frame 2.

Pivot 3 can be understood with reference to all the figures. For example, and with respect to FIG. 2, pivot 3 is shown with hay-bale-receiving loader frame 2 pivoted with its major axis 23 parallel to axle 4 between wheels 41. As will be hereinafter explained, in this disposition of the pivot of hay-bale-receiving loader frame 2 relative to axle 4, lifting of bale 1 to a balanced position overlying axle 4 can occur. Alternatively, and with reference to FIGS. 1 and 3, pivot 3 enables hay-bale-receiving loader frame 2 to be pivoted 90 degrees so that major axis 11 is substantially parallel to handle 5. In this disposition, bale 1 is more conveniently balanced on axle 4 for transport (because the moment of inertia of bale 1 relative to axle 4 is maximized). Optimally, pivot 3 includes conventional detents so that the preferred position of the bale-receiving loader frame 2 is either that shown in FIG. 2, or alternatively, that position shown in FIGS. 1 and 3.

Axle 4 is conventional. It has wheels 41 mounted at either end of the axle. Pivot 3 is mounted medially between the wheels 41 and is here shown elevating pivot 3 on a bracket 42 extending upwardly from axle 4 (see FIG. 1).

Handle 5 is likewise easily understood. This handle fastens to axle 4 and extends away from axle 4 a distance greater than one-half the length of bale 1, terminating at pulling crosspiece 51. Handle 5 is provided with a ground-engaging lug 52. As can be seen with respect to FIG. 3, ground-engaging lug 52 enables the hay cart of this invention to rest with bale 1 supported and balanced overlying axle 4.

Operation is easy to understand. The cart is moved adjacent to bale 1 with the hay-bale-receiving loader frame 2 having its major axis 23 disposed parallel to axle 4. In this disposition, bale 1 is rotated in the direction of arcuate arrow 6 so that bale 1 is received within hay-bale-receiving loader frame 2. At this point, tine 27 can optimally be engaged to the bale so that when rotation of hay-bale-receiving loader frame 2 occurs relative to axle 4, elevation and balancing of the bale overlying axle 4 occurs with out the bale slipping free of the bale-receiving loader frame.

Elevation and balancing of bale 1 occurs by rotating handle 5 at pulling crosspiece 51 downward from a substantially vertical disposition to a substantially horizontal disposition. Thereafter, the hay-bale-receiving loader frame 2 can be pivoted on pivot 3 so that its major axis 23 is substantially parallel to handle 5.

It will be noted that hay-bale-receiving loader frame 2 substantially confines bale 1 on four of its six sides. This being the case, once bale 1 is within hay-bale-receiving loader frame 2, ties 16 can be cut. After the cutting of ties 16, the bale will typically be flaked normal to axis 11 of bale 1.

What is claimed is:

1. A cart for transporting and dispensing hay baled in the form of a rectangular solid along a major axis, the cart comprising in combination:

two wheels disposed relative to an axle for rolling movement of the cart over the ground;

a handle fixed with respect to the axle for pulling the wheels and axle over the ground;

a hay-bale-receiving loader frame having at least two major sides intersecting at a major axis for confronting two major sides of hay baled in the form of a rectangular solid;

a pivot connecting to a bale-receiving loader frame relative to the axle and handle to dispose the two major sides of the hay-bale-receiving loader frame at equal angular intervals relative to the axle; and, the pivot permitting movement of the hay-bale-receiving loader frame in a plane parallel to the axle between a hay bale lifting disposition wherein the major axis of the hay bale receiving loader frame is parallel to the axle, and a hay bale transporting disposition, wherein the major axis of the hay-bale-receiving loader frame is normal to the axle.

2. The cart for transporting and dispensing hay according to claim 1 and wherein:

the handle includes a stop for registry to the hay-bale-receiving loader frame when the major axis of a bale-receiving loader frame is normal to the axle.

3. The cart for transporting and dispensing hay according to claim 1 and wherein:

the hay-bale-receiving loader frame defines two bale constraining walls equidistant from the pivot for confining a bale on the hay-bale-receiving loader frame.

4. The cart for transporting and dispensing hay according to claim 1 and wherein:

the handle includes a landing leg for disposing the cart with a hay-bale-receiving loader frame elevated from the ground.

5. The cart for transporting and dispensing hay according to claim 1 and further including:

at least one tine mounted to the hay-bale-receiving loader frame for providing an impaling movement into hay baled in the form of the right angular solid when confronted to a major side of the hay bale receiving loader frame.

6. A process for lifting baled hay in the form of a rectangular solid along a major axis from a surface and dispensing baled hay from a cart, the process comprising the steps of:

providing a cart having:

two wheels disposed relative to an axle for allowing rolling movement of the cart over the ground;

a handle fixed with respect to the axle for pulling the wheels and axle over the ground;

a hay-bale-receiving loader frame having at least two major sides intersecting at a major axis for confronting two major sides of hay baled in the form of a rectangular solid;

a pivot connecting to a bale-receiving loader frame relative to the axle and handle to dispose the two major sides of the hay-bale-receiving loader frame at equal angular intervals relative to the axle; and, the pivot permitting movement of the hay-bale-receiving loader frame in a plane parallel to the axle between a hay bale lifting disposition wherein the major axis of the hay-bale-receiving loader frame is parallel to the axle and a hay bale transporting disposition wherein the major axis of the hay bale receiving loader frame is normal to the axle;

confronting a major side of the hay-bale-receiving loader frame to the surface;

disposing the baled hay on a major side of the hay-bale-receiving loader frame;

elevating the baled hay with the handle relative to the axle of the cart to balance the baled hay on the axle between the wheels of the cart; and, transporting the elevated baled hay on the wheels by pulling the handle.

7. The process for lifting baled hay according to claim 6 and wherein the step of disposing the baled hay on a major side of the hay-bale-receiving loader frame comprises the step of:

rolling the hay bale onto a major side of the hay bale receiving loader frame.

8. The process for lifting baled hay according to claim 6 and including the further step of:

after the elevating step, severing ties on the hay bale to permit transport and flaking of the hay bale from the cart.

* * * * *